UNITED STATES PATENT OFFICE.

NOBILE CARLO TOMMASI, OF BASEL, SWITZERLAND, ASSIGNOR TO USINES ELECTRIQUES DE LA LONZA, OF GAMPEL, SWITZERLAND.

PROCESS FOR OBTAINING NITROGEN FROM AIR.

1,295,635.  Specification of Letters Patent.  Patented Feb. 25, 1919.

No Drawing.  Application filed June 15, 1917. Serial No. 175,030.

*To all whom it may concern:*

Be it known that I, NOBILE CARLO TOMMASI, a subject of the King of Italy, and resident of Basel, Switzerland, have invented a new and useful Process for Obtaining Nitrogen from Air, of which the following is a full, clear, and exact specification.

The nitrogen required for the manufacture of cyanamids and other nitrogen compounds, which nitrogen, particularly in the case of the manufacture of cyanamids, must be as free as possible from oxygen, has hitherto been obtained by mechanical or chemical processes having no relationship to the processes of combining the nitrogen and working up the nitrogen compound produced, for instance by processes depending on the liquefaction of air or the combustion of carbon, copper or the like.

The present invention relates to a process in which the production of ammonium sulfate from a cyanamid is so conducted that the nitrogen necessary for making the cyanamid is thereby obtained from the air.

The process is based on the fact that ammonium sulfite is more easily oxidized than is sulfur dioxid in the form of gas or dissolved in water.

For carrying out the process ammonium sulfite is made, for instance, by direct union, in presence of water vapor, of the ammonia made from cyanamid with sulfur dioxid; the latter may be made from pyrites, sulfur, gypsum or the like. The sulfite solution thus produced, preferably in a concentrated condition, is treated with air on the counter-current principle, such as in a series of spraying towers, so as to oxidize the sulfite to sulfate; the fresh air is brought into contact with the nearly completely oxidized solution, whereby the last portion of sulfite is oxidized to sulfate, while the air almost exhausted of oxygen is brought into contact with fresh sulfite solution.

In thus using ammonium sulfite instead of sulfurous acid for obtaining the nitrogen, there is the advantage that all those precautions in respect of the gases concerned, such as their purity, concentration in sulfur dioxid and the like, which are necessary for the usual methods of making sulfuric acid, are avoided.

The following examples illustrate the invention:

Example 1: 100 liters of a solution containing 48.3 kilos of ammonium sulfite, obtained by leading ammonia and sulfur dioxid into water, are passed through five spraying towers charged with pieces of coke, in counter-current to air. The following table shows the progress of the reaction by reference to the content of the solution in ammonium sulfite and ammonium sulfate after passage through the five towers.

|  | Tower. | | | | |
| --- | --- | --- | --- | --- | --- |
|  | I. | II. | III. | IV. | V. |
|  | *Kg.* | *Kg.* | *Kg.* | *Kg.* | *Kg.* |
| $(NH_4)_2SO_3$, 48.3 kg | 11.3 | 9.65 | 2.15 | 1.13 | 0 |
| $(NH_4)_2SO_4$, 0 kg | 42.2 | 44.0 | 52.3 | 53.5 | 5.5 |
| Tower temperature | 55° C. | 78° C. | 80° C. | 80° C. | 65° C. |

Example 2: In a second experiment a given quantity of air was brought in contact with a current of ammonia sulfite solution on the counter-current principle and the diminution of oxygen was found to be as follows:

|  | Hours. | | | |
| --- | --- | --- | --- | --- |
|  | 0 | 3 | 6 | 9 |
| Percentage of oxygen in the air which has passed through | 20.7 | 8 | 3.2 | 0.1–0.2 |

The 48.3 kilos of ammonium sulfite used in Example 1 contain 11.7 kilos of nitrogen and take up 6.7 kilos of oxygen which correspond in the atmospheric air with 22.4 kilos of nitrogen. Thus nearly twice as much pure nitrogen has been obtained as was necessary for the manufacture of the original cyanamid, that is to say more than enough to cover abundantly nitrogen lost in making and working up the cyanamid.

The most favorable temperature for the process lies between 70° and 75° C., since the oxidization is the more rapid and complete the higher the temperature. Temperatures higher than 75° C. are not advantageous, as then the hydrolytic dissociation of the ammonium sulfite acts destructively. Still, as is obvious, even higher temperatures may be used if the process is so conducted that any ammonia carried away with the nitrogen is recovered.

What I claim is:

1. The described process for obtaining nitrogen from air wherein the air is passed through a solution of ammonium sulfite on the counter-current principle until the oxygen has been removed from the air to such an extent that the remaining nitrogen contains less than 1% of oxygen.

2. The described process for obtaining nitrogen from air wherein the air is passed through a solution of ammonium sulfite on the counter-current principle at a temperature of over 70° C. until the oxygen has been removed from the air to such an extent that the remaining nitrogen contains less than 1% of oxygen.

In witness whereof I have hereunto signed my name this fourteenth day of May, 1917, in the presence of two subscribing witnesses.

NOBILE CARLO TOMMASI.

Witnesses:
WILLIS E. RUFFNER,
GIASON S. BIZRARRI.